(12) United States Patent
Bazzi et al.

(10) Patent No.: US 10,148,210 B2
(45) Date of Patent: Dec. 4, 2018

(54) SYSTEMS AND METHODS OF OPTIMIZING OPERATION EFFICIENCY OF A MOTOR DRIVE

(71) Applicant: University of Connecticut, Farmington, CT (US)

(72) Inventors: Ali Bazzi, South Windsor, CT (US); Artur Ulatowski, East Windsor, CT (US); Yiqi Liu, Mansfield, CT (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 15/605,161

(22) Filed: May 25, 2017

(65) Prior Publication Data

US 2017/0346433 A1 Nov. 30, 2017

Related U.S. Application Data

(60) Provisional application No. 62/341,198, filed on May 25, 2016.

(51) Int. Cl.
| | |
|---|---|
| *H02P 23/22* | (2016.01) |
| *H02P 23/00* | (2016.01) |
| *H02P 27/04* | (2016.01) |
| *H02P 23/02* | (2006.01) |

(52) U.S. Cl.
CPC ...... *H02P 23/0022* (2013.01); *H02P 23/0004* (2013.01); *H02P 23/02* (2013.01); *H02P 27/047* (2013.01)

(58) Field of Classification Search
CPC .......................... H02P 23/0022; H02P 27/047

USPC ......................................................... 318/503
See application file for complete search history.

(56) References Cited

U.S. PATENT DOCUMENTS

| | | | |
|---|---|---|---|
| 2005/0007051 A1* | 1/2005 | Lelkes | H02P 6/15 318/400.09 |
| 2010/0102766 A1* | 4/2010 | Kern | H02P 6/182 318/400.35 |

OTHER PUBLICATIONS

Sul, S. K., et al., A Novel Technique for Optimal Efficiency Control of a Current-Source Invertor-Fed Induction motor, IEEE Trans. Power Electron., vol. 3, No. 2, pp. 192-199, Apr. 1988.
Technique, N. M., et al., Switching Flow-Graph Nonlinear Modeling Technique, IEEE Trans. Power Electron, vol. 9, No. 4, pp. 405-413, 1994.
Sudhoff, S., et al., An Advanced Induction Machine Model for Predicting Inverter-Machine Interaction, Power Electronics Specialists Conference (PESC), vol. 17, No. 2, pp. 203-210, 2001.

(Continued)

*Primary Examiner* — Kawing Chan
(74) *Attorney, Agent, or Firm* — McCarter & English, LLP

(57) ABSTRACT

Methods and systems of optimizing efficiency of a motor drive or generator are provided. The methods include measuring data corresponding to input power and output power of a motor drive or generator at a control parameter and different load values. The methods include generating a three-dimensional surface model based on the measured data. The three-dimensional surface model can estimate an efficiency of the motor drive or generator at the control parameter and at unmeasured load values. The methods can include determining optimal efficiency of the motor drive or generator at the different load values and the unmeasured load values based on the three-dimensional surface model.

15 Claims, 19 Drawing Sheets

(56) References Cited

OTHER PUBLICATIONS

Nandi, S., A Detailed Model of Induction Machines With Saturation Extendable for Fault Analysis, IEEE Trans. Ind. Appl., vol. 40, No. 5, pp. 1302-1309, Sep. 2004.

Chi, S., et al., Efficiency-Optimized Flux-Weakening Control of PMSM Incorporating Speed Regulation, in Proc. IEEE Power Electronics Specialists Conference, pp. 1627-1633, 2007.

Uddin, M., et al., New Online Loss-Minimization-Based control of an Induction Motor Drive, IEEE Trans. Ind. Electron., vol. 23, No. 2, pp. 926-933, 2008.

Pippuri, J., et al., Time-Harmonic Induction-Machine Model Including Hysteresis and Eddy Currents in Steel Laminations, IEEE Trans. Magn., vol. 45, No. 7, pp. 2981-2989, Jul. 2009.

Wang, L., et al., Including Magnetic Saturation in Voltage-Behind-Reactance Induction Machine Model for EMTP-Type Solution, IEEE Trans. Power Syst., vol. 25, No. 2, pp. 975-987, 2010.

Bazzi, A. M., et al., Constrained Inline Efficiency Optimization to Guarantee Load Support in Motor Drives, in Proc. IEEE Electric Machines & Drives Conference (IEMDC), pp. 1149-1152, 2011.

Michael, R., et al., Flux Maps for an Efficiency-Optimal Operation of Asynchronous Machines in Hybrid Electric Vehicles, in Proc. IEEE Vehicle Power and Propulsion Conference (VPPC), pp. 1-6, 2011.

Valdivia, V., et al., Black-box Modeling of Three-Phase Voltage Source Inverters for System-Level Analysis, IEEE Trans. Ind. Electron., vol. 59, No. 9, pp. 3648-3662, 2012.

Bazzi, A., et al., System-Level Power Loss Sensitivity to Various Control Variables in Vector-Controlled Induction Motor Drives, IEEE Trans. Ind. App., vol. 49, No. 3, pp. 1367-1373, May/Jun. 2013.

U.S. Appl. No. 62/341,198, filed May 5, 2016.

\* cited by examiner

MODEL NAMING

| Name | Model |
|---|---|
| A | Thin-Plate Spline Interpolation |
| B | Biharmonic Interpolation |
| C | Cubic Interpolation |
| D | Linear Interpolation |
| E | Linear LOWESS |
| F | Quadratic LOWESS |
| G | Polynomial |
| H | Metamodel |

FIG. 7

MOTOR DRIVE EFFICIENCY NUMERICAL TRAINING DATA

| 10% Load | | 25% Load | | 50% Load | | 75% Load | | 100% Load | |
|---|---|---|---|---|---|---|---|---|---|
| V/Hz [Vs] | Eff. [%] | V/Hz [Vs] | Eff. [%] | V/Hz [Vs] | Eff. [%] | V/Hz [Vs] | Eff. [%] | V/Hz [Vs] | Eff. [%] |
| 2 | 43.17 | 2 | 60.03 | 2 | 67.73 | 2 | 67.94 | 2 | 59.36 |
| 1.9 | 43.48 | 1.9 | 60.16 | 1.95 | 68.59 | 1.99 | 68.25 | 1.99 | 57.67 |
| 1.8 | 44.20 | 1.8 | 60.33 | 1.9 | 67.83 | 1.98 | 68.00 | 1.98 | 56.92 |
| 1.7 | 44.45 | 1.7 | 60.22 | 1.85 | 67.24 | 1.97 | 67.68 | 1.97 | 56.56 |
| 1.6 | 44.58 | 1.6 | 59.48 | 1.8 | 66.52 | 1.96 | 67.41 | 1.96 | 55.68 |
| 1.5 | 45.14 | 1.5 | 58.49 | 1.75 | 65.49 | 1.95 | 67.10 | 1.95 | 55.20 |
| 1.4 | 45.07 | 1.4 | 56.98 | 1.7 | 64.78 | 1.90 | 65.08 | 1.94 | 53.79 |
| 1.3 | 44.88 | 1.3 | 54.62 | 1.6 | 62.19 | 1.85 | 63.53 | 1.93 | 52.74 |
| 1.2 | 44.48 | 1.2 | 50.12 | 1.5 | 58.89 | 1.80 | 61.43 | 1.92 | 51.37 |

FIG. 8

| 19% Load | | 33% Load | | 80% Load | |
|---|---|---|---|---|---|
| V/Hz [Vs] | Eff. [%] | V/Hz [Vs] | Eff. [%] | V/Hz [Vs] | Eff. [%] |
| 2 | 49.53 | 2 | 64.28 | 2 | 66.79 |
| 1.9 | 50.20 | 1.9 | 63.53 | 1.97 | 65.39 |
| 1.8 | 50.86 | 1.8 | 63.41 | 1.94 | 64.82 |
| 1.7 | 51.54 | 1.7 | 61.36 | 1.91 | 63.00 |
| 1.6 | 52.22 | 1.6 | 60.00 | 1.88 | 62.63 |
| 1.5 | 51.17 | 1.5 | 58.01 | 1.85 | 61.48 |

MOTOR DRIVE EFFICIENCY NUMERICAL VALIDATION DATA

FIG. 13

19% LOAD EFFICIENCY PERCENTAGE ERROR

| V/Hz | A | B | C | D | E | F | G | H |
|---|---|---|---|---|---|---|---|---|
| 1.20 | 1.50% | 1.14% | 2.32% | 0.40% | 2.45% | 3.88% | 4.65% | 2.32% |
| 1.30 | 5.07% | 5.01% | 5.31% | 3.92% | 3.27% | 5.69% | 7.58% | 5.31% |
| 1.40 | 2.73% | 3.77% | 2.88% | 1.32% | 0.37% | 3.70% | 4.61% | 5.15% |
| 1.50 | 5.27% | 6.70% | 5.66% | 3.87% | 2.91% | 6.04% | 7.02% | 5.01% |
| 1.60 | 3.88% | 5.28% | 4.72% | 2.48% | 2.29% | 4.82% | 5.96% | 2.20% |
| 1.70 | 5.92% | 7.27% | 6.98% | 4.61% | 4.13% | 6.73% | 7.97% | 3.03% |
| 1.80 | 7.17% | 8.58% | 8.10% | 5.94% | 5.64% | 8.07% | 9.34% | 1.04% |
| 1.90 | 7.74% | 10.48% | 8.67% | 6.55% | 6.50% | 8.81% | 10.06% | 5.20% |
| 2.00 | 8.62% | 11.61% | 10.04% | 7.58% | 5.02% | 9.72% | 10.74% | 6.61% |
| Average Error | | | | | | | | |
|  | 5.32% | 6.65% | 6.08 | 4.08 | 3.62% | 6.38% | 7.55% | 4.32% |

FIG. 14

33% LOAD EFFICIENCY PERCENTAGE ERROR

| V/Hz | A | B | C | D | E | F | G | H |
|---|---|---|---|---|---|---|---|---|
| 1.40 | 7.43% | 7.43% | 6.52% | 3.05% | 2.80% | 7.18% | 6.09% | 6.58% |
| 1.50 | 5.63% | 3.04% | 5.67% | 1.04% | -0.12% | 6.19% | 4.90% | 6.57% |
| 1.60 | 5.08% | 2.99% | 2.95% | 0.59% | -0.35% | 5.63% | 3.98% | 2.90% |
| 1.70 | 4.82% | 3.71% | 2.83% | 0.51% | 0.17% | 5.30% | 3.50% | 0.60% |
| 1.80 | 2.36% | 1.62% | 0.73% | -1.72% | -2.03% | 2.70% | 1.38% | 2.52% |
| 1.90 | 2.55% | 2.18% | 1.05% | -1.43% | -1.63% | 3.03% | 1.64% | 2.43% |
| 2.00 | 0.62% | -0.29% | -0.83% | -2.77% | -5.90% | 1.62% | -0.06% | 3.17% |
| Average Error | | | | | | | | |
| | 4.07% | 2.95% | 2.70% | -0.11% | -1.01% | 4.52% | 3.06% | 3.54% |

FIG. 15

80% LOAD EFFICIENCY PERCENTAGE ERROR

| V/Hz | A | B | C | D | E | F | G | H |
|---|---|---|---|---|---|---|---|---|
| 1.85 | 1.49% | -1.28% | -0.24% | -2.02% | -2.05% | -0.73% | 0.00% | 0.79% |
| 1.88 | 1.31% | -1.50% | -0.31% | -2.17% | -2.10% | 0.10% | 0.67% | 2.41% |
| 1.91 | 0.24% | -0.09% | 0.53% | -0.66% | -0.82% | 1.95% | 2.32% | 0.00% |
| 1.94 | 0.40% | -0.68% | -0.59% | -1.59% | -1.24% | 1.68% | 1.33% | 2.60% |
| e | 0.65% | 0.42% | 1.54% | 0.10% | -0.11% | 1.69% | 2.01% | 2.24% |
| e | 0.19% | -0.71% | -0.42% | -0.85% | -0.54% | 2.35% | 1.03% | 0.63% |
| Average Error | | | | | | | | |
|  | 0.71% | -0.64% | 0.09% | -1.20% | -1.14% | 1.17% | 1.23% | 1.45% |

FIG. 16

$p_{ij}$ FOR TOP SUB-MODEL OF METAMODEL

| j \ i | 0 | 1 | 2 |
|---|---|---|---|
| 0 | 58.41 | -20.96 | 4.419 |
| 1 | 0.7753 | 0.1912 | 0 |
| 2 | -0.0093 | 0 | 0 |

FIG. 17

$p_{ij}$ PARAMETER VALUES

| j \ i | 0 | 1 | 2 | 3 | 4 |
|---|---|---|---|---|---|
| 0 | -576.7 | -50.97 | -0.2633 | -0.00046 | -9.02E-06 |
| 1 | 2507 | 130.7 | 0.4178 | 0.001602 | 3.28E-06 |
| 2 | -3862 | -121.5 | 0.2861 | -0.00054 | |
| 3 | 2843 | 50.73 | 0.0644 | | |
| 4 | -1015 | -7.972 | | | |
| 5 | 141.5 | | | | |

FIG. 18

OPTIMAL V/HZ PREDICTIONS AND MAXIMUM EFFICIENCY USING
POLYNOMIAL MODEL

| Torque | Optimal V/Hz | | Error (%) | η @ Optimal V/Hz | | Error (%) |
|---|---|---|---|---|---|---|
| | Meas. | Calc. | | Meas. | Calc. | |
| 10% | 1.5 | 1.50 | 0 | 45.14 | 45.51 | 1.50 |
| 19% | 1.6 | 1.75 | 9 | 55.22 | 55.67 | 1 |
| 25% | 1.8 | 1.85 | 2.9 | 60.33 | 62.36 | 1.85 |
| 33% | 2 | 1.93 | 3.5 | 64.28 | 67.50 | 1.93 |
| 50% | 1.95 | 2 | 3 | 68.58 | 73.29 | 2 |
| 80% | 2 | 2.03 | 2 | 66.79 | 67.98 | 2 |

FIG. 19

SYSTEMS AND METHODS OF OPTIMIZING OPERATION EFFICIENCY OF A MOTOR DRIVE

CROSS-REFERENCE TO RELATED APPLICATION

The present application claims priority benefit to a provisional patent application entitled "Systems and Methods of Optimizing Operation Efficiency of a Motor Drive," which was filed on May 5, 2016 and assigned Ser. No. 62/341,198. The entire content of the foregoing provisional application is incorporated herein by reference.

TECHNICAL FIELD

The present invention generally relates to systems and methods of optimizing operation efficiency of a motor drive and, in particular, to systems and methods including behavioral modeling of the loss or efficiency of the motor drive to accurately determine optimal performance of the motor drive.

BACKGROUND

Electric motor drive systems (e.g., energy conversion systems including an electric machine) have achieved very high penetration in industrial, commercial and residential applications, where up to 89% of rotating machines use electric motors, while the remaining 11% are powered by combustion engines using fossil fuels (natural gas, gasoline, diesel, etc.). This makes electric motor drives the largest electricity consumers, accounting for almost 60% of industrial, up to 25% of commercial and up to 30% of residential electricity usage. Further, electric motor drive systems account for the largest electricity consumption in the U.S. and worldwide and are the workhorse of the industry due to their flexibility and reliability. Additionally, electric motor drive systems are extensively used in commercial and residential heating, ventilation and air conditioning (HVAC) systems in compressors, pumps and fans, modern transportation systems, and industrial manufacturing processes. With the electricity usage accounting for 97% of costs of electric motor drive operation and yearly electricity usage in GWh, even small improvements in the operating efficiency of the electric motor drive system, due to its market penetration, would result in billions of dollars in annual energy savings worldwide due to reduction in electrical energy usage and reduction of the burden on the environment by decreasing the demand for fossil fuels used to generate electricity Additionally, due to high penetration and high electricity usage, electric motors and drives used in all applications are subject to new legislation which mandates minimum efficiency in order to promote energy conservation and release the stress on the power grid. Motor drive system efficiency is directly correlated to its losses, and, therefore it is important to well-characterize and model the combined motor drive efficiency. Losses such as mechanical friction, windage and stray losses in a machine or stray losses in an inverter, are often ignored or approximated since focus is given to major losses. Major losses include core and copper losses in a machine, and switching and conduction losses in an inverter. Such omissions create model inaccuracies and cause suboptimal hardware performance.

Currently, motor drive systems are modeled analytically using physics-based equations describing the phenomenon of electro-mechanical energy conversion which is governing the motor drive system. In particular, traditional modeling of electric motor drive systems is done mathematically where only the major losses in the motor and inverter are considered, due to the complexity of the system. However, the detailed analytical models of this phenomenon are hard to obtain due to their complexity and various nonlinearities and electrical, mechanical, thermal, and magnetic interactions in the motor drive. Therefore, analytical models are accurate to an extent but cannot include all possible power losses used in motor drive efficiency calculation. Inaccurate or incomplete analytical models that exist in the literature lead to inaccurate knowledge of a drive's efficiency and thus may not reflect accurate energy consumption.

Some electric motor drive losses are well understood and modeled either analytically with closed form solutions while others are accounted for using finite element method (FEM) based simulations. Methods of defining motor parameters on which loss models are based have well established testing procedures, although some of the losses are ignored or approximated due difficulty of modeling or their small magnitude.

In general, power losses in an induction motor drive system can be split into the following categories: (i) power conversion losses, which include semiconductor conduction and switching losses in rectifier, inverter, and other power electronics stages which are generally included in efficiency calculations, and stray electrical losses due to filtering or harmonics, and which are commonly ignored; and (ii) other losses in the motor drive system originate from the machine and can be divided into copper, iron or core, friction, windage and stray losses. Machine copper losses are generally included in efficiency models. Core losses are well understood but difficult to model and are often approximated in loss models with increasingly higher accuracy using analytical methods under both sinusoidal and pulse-width modulation (PWM) sources and FEM or other simulations. Friction, windage and stray losses are approximated in most drive-level efficiency models due to their complexity and hardware dependency. Thus, traditionally, as much as 10% of losses in the motor drive system are either approximated or simply ignored.

Accurately modeling electric motors and drives as a system is fundamental for motor drive efficiency analysis as well as control design, reliability testing, and fault diagnosis. Existing research has extensively studied individual induction machine and inverter models, including impact of inverter topologies and switching schemes on its losses, while research about the combined drive system efficiency is relatively rare. In such drive efficiency studies, certain power losses are ignored, assumed, or approximated as discussed above. In some studies, analysis is performed on very specific hardware setup and motor conditions which will not scale or transfer well. Further, the drive system can have different maximum efficiency operating points than the individual motor or inverter, making the derivation of the maximum efficiency point of the overall motor drive system a nontrivial task.

Based on existing literature, it is clear that loss analysis in a motor drive system for the purpose of efficiency modeling is a challenging task due to difficulty of modeling of electrical, magnetic, mechanical, and thermal interactions taking place in power electronics and the electric machine. Overall loss or efficiency models are highly dependent on the hardware used and are not easily adaptable.

Thus, a need exists for methods of generating a comprehensive model of the entire motor drive system that can be easily adapted to different hardware configurations, and combines the effects of the motor and inverter interaction with all inherent losses and non-idealities. Further, a need exists for methods of generating a comprehensive behavioral model based on physical measurements including all drive system losses that accurately estimate optimal points of performance of the motor drive system. These and other needs are addressed by the systems and methods of the present disclosure.

SUMMARY

In accordance with embodiments of the present disclosure, exemplary systems and methods of modeling the power loss and efficiency of electric motor drives systems are provided. The disclosed systems and methods improve the efficiency of motor drive systems. The exemplary method includes all possible motor drive losses without ignoring, approximating or assuming any of the inverter or machine losses, which has been done in traditional models. Therefore, the model is comprehensive and accurate. The method uses behavioral modeling of the drive's loss or efficiency and determines the maximum efficiency or minimum loss points to optimize energy consumption.

The disclosed systems and methods develop and deploy high performance motor drive systems that operate at maximum efficiency for any operating condition. Using the exemplary behavioral model, the end user would experience a system with lower energy consumption which translates to financial and environmental gains. Since electric drive systems are popular in various industries, such as enterprise, residential, transportation, and military applications, making it the largest energy consumer for all of those sectors, improved modeling of the drives' efficiency and operating these drives at maximum efficiency can lead to global energy savings.

The behavior of the motor drive system can be modeled using a black-box approach, and data used for modeling is from physical measurements under different operating conditions. Physical measurements and data extracted do not make any assumptions or approximations about the motor drive system, thereby accounting for all possible losses in the system regardless of magnitude or origin. This increases the generated model accuracy and can be used to refine analytical models. The disclosed behavioral modeling is easily adaptable to different control schemes, hardware configurations or operating conditions, and similar testing can be performed for specific motor drivers to appropriately adjust operation of such motor drives to achieve optimal performance.

In accordance with embodiments of the present disclosure, an exemplary method of optimizing operation efficiency of a motor drive is provided. The method include measuring data corresponding to input power of a motor drive at a control parameter and different load values. The method includes generating a three-dimensional surface model based on the measured data. The three-dimensional surface model can estimate the motor drive efficiency at the control parameter and at unmeasured load values. As discussed herein, unmeasured values should be understood to represent values at which the behavioral model has not been trained. In particular, based on the trained load values, the three-dimensional surface model can be used to estimate the motor drive efficiency at untrained load values. The method includes determining optimal efficiency of the motor drive for the different load values and the unmeasured load values based on the three-dimensional surface model.

The input power can be an electric power of the motor drive. The output power can be a mechanical power of the motor drive. The control parameter can be a voltage-to-frequency (V/f or V/Hz) ratio. In some embodiments, the different load values can correspond to loads imparted by a dynamometer load. In some embodiments, the different load values can correspond to loads imparted by a torque load.

The method can include measuring power loss of the motor drive at the control parameter and the different load values. The method can include locating a convex surface corresponding to minimum power loss of the motor drive in the three-dimensional surface model. The convex surface can correspond to the minimum power loss corresponding to the optimal efficiency of the motor drive. The method can include adjusting operation of the motor drive (e.g., in real-time) to perform at estimated configurations in response to load values based on the three-dimensional surface model such that the motor drive performs at the optimal efficiency. The three-dimensional model can be a behavioral model of the motor drive.

In some embodiments, generating the three-dimensional surface model can include applying a quadratic and linear locally weighted scatterplot smoothing (LOWESS) on the measured data for the motor drive under stator flux weakening operation. In some embodiments, generating the three-dimensional surface model can include applying a cubic interpolation on the measured data for the motor drive under a slightly weakened flux operation. The three-dimensional surface model generated with the cubic interpolation can result in a maximum-efficiency stator flux of the motor drive. In some embodiments, generating the three-dimensional surface model can include applying a polynomial interpolation on the measured data for the motor drive under a rated flux operation. In some embodiments, generating the three-dimensional surface model can include applying a linear interpolation on the measured data.

In accordance with embodiments of the present disclosure, an exemplary system of motor drive optimization is provided that includes a motor drive, a database (e.g., any type of electronic data storage device), and a processing device. The database can be configured to receive and store data corresponding to input power and output power of the motor drive at a control parameter and different load values. The processing device can be configured to extract and/or measure desired system characteristics corresponding to input power and output power of the motor drive at the control parameter and the different load values. The processing device can be configured to generate a three-dimensional surface model based on the extracted and/or measured data. Although discussed and illustrated as a three-dimensional surface model, in some embodiments, the surface model can be greater than three dimensions. The three-dimensional surface model can estimate an efficiency of the motor drive at the control parameter and at unmeasured load values. The processing device can be configured to determine an optimal efficiency of the motor drive for the different load values and the unmeasured load values based on the three-dimensional surface model. The processing device can be configured to adjust operation of the motor drive in real-time to perform at estimated configurations in response to load values based on the three-dimensional surface model.

In accordance with embodiments of the present disclosure, an exemplary non-transitory computer-readable medium storing instructions is provided. Execution of the instructions by a processing device can cause the processing device to implement a method of optimizing operation efficiency, as disclosed herein.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed systems and methods of optimizing operation efficiency of a motor drive, reference is made to the accompanying figures, wherein:

FIG. 7 is a table of model names used for generation of an exemplary three-dimensional behavior model according to the present disclosure.

FIG. 8 is a table of numerical training data for motor drive efficiency according to the present disclosure.

FIG. 13 is a table of numerical validation data for motor drive efficiency according to the present disclosure.

FIG. 14 is a table of 19% load efficiency percentage error according to the present disclosure.

FIG. 15 is a table of 33% load efficiency percentage error according to the present disclosure.

FIG. 16 is a table of 80% load efficiency percentage error according to the present disclosure.

FIG. 17 is a table of top sub-models of a metamodel according to the present disclosure.

FIG. 18 is a table of parameter values for a polynomial behavioral model according to the present disclosure.

FIG. 19 is a table of optimal V/Hz prediction and maximum efficiency using a polynomial behavioral model according to the present disclosure.

DESCRIPTION OF EXEMPLARY EMBODIMENTS

In accordance with embodiments of the present disclosure, exemplary systems and methods of optimizing operating efficiency of a motor drive are provided. The exemplary systems and methods generate a comprehensive model of the entire motor drive system that can be easily adapted to different hardware configurations, and combines the effects of the motor and inverter interaction with all inherent losses and non-idealities. The exemplary systems and methods further generate a comprehensive behavioral model based on physical measurements including all drive system losses that accurately estimate optimal points of performance of the motor drive system.

The behavior model resulting from the exemplary method does not ignore or assume any of the losses or phenomena which are occurring in the electric drive system as the analytical modeling approaches are prone to do. This results in accurately described power losses and efficiency, which can be used for product development, optimal efficiency control, and better system sizing in addition to energy and environmental savings. Although discussed herein with respect to motor drives, it should be understood that the exemplary systems and methods can be implemented with generators. For example, with generators, the input power can be mechanical and the output power can be electrical, and the systems and methods can be used to optimize the operating efficiency of the generator.

Figure 1:
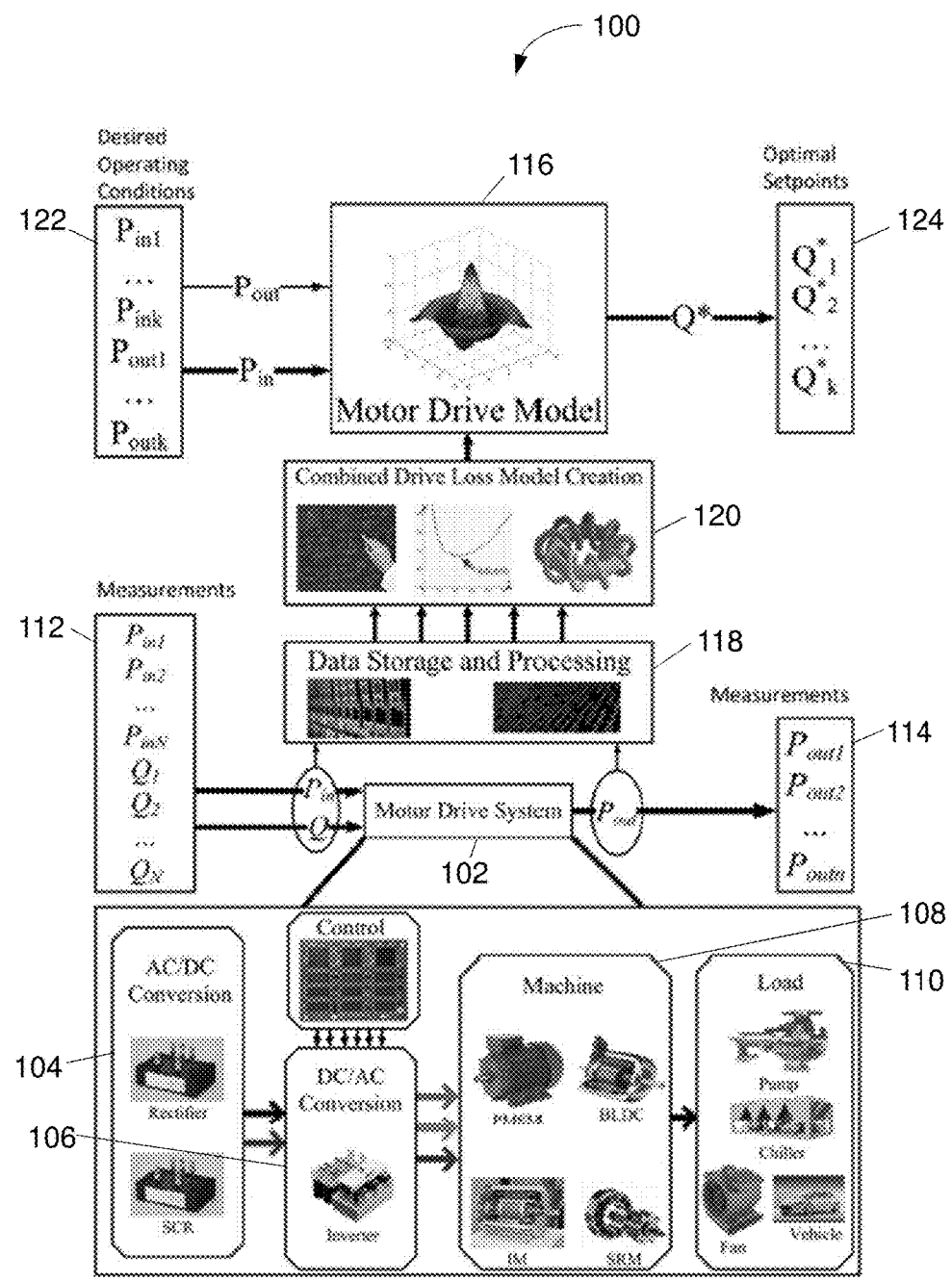
FIG. 1 is diagram of an exemplary behavioral modeling system according to the present disclosure.

FIG. 1 is a diagram of an exemplary behavioral modeling system 100 (hereinafter "system 100"). Given a motor drive system 102, which can include, but is not limited to, (i) an AC-to-DC conversion stage 104, such as a diode bridge, silicone controlled rectifier, or active rectifier; (ii) a DC-to-AC converter 106 with variable frequency output (e.g., an inverter or power electronic converter of any topology driving an AC or DC electric machine); (iii) an electric machine 108 (e.g., rotational or linear, induction (IM), brushless DC (BLDC), permanent magnet synchronous machine (PMSM), a switched reluctance (SRM) or the like) to convert the electrical energy into mechanical energy; and (iv) a load 110 that, depending on an application, can be a vehicle, pump, compressor, chiller, conveyor, or the like. The motor drive system 102 can be controlled using an appropriate control scheme implemented on a suitable embedded platform and auxiliary hardware.

Measurements 112, 114 taken from the motor drive system 102 can be input into the system 100. Measurements 112 can be the input into the motor drive system 102, and measurements 114 can be the output from the motor drive system 102. In motor applications, input power $P_{in}$ can be in the form of electrical power measured directly or calculated from DC or AC voltage and current measurements, and output power $P_{out}$ can be mechanical power calculated from speed and torque measurements or estimates. Control can be performed to achieve one or more set points Q which can be speed, torque, flux strength, or other variables. Given that the measurements or estimations are accurate, the exact method of performing such tasks is irrelevant to the methodology. In some embodiments, the measurements 112, 114 can be input into a data storage and processing system 118. The system 118 can process the measurements 112, 114 and generate a first level of combined drive loss (or other loss) model creation 120.

Measured and/or estimated collected data for $P_{in}$, $P_{out}$, and Q can be used to create a black box model 116, relating the behavior of the input power, output power, and quantities observed using appropriate modeling techniques. The model 116 can be used to predict how the motor drive system 102 will behave from an efficiency of power loss perspective for certain operating conditions, whether the model 116 was trained for these conditions or not.

Such a model 116 can be implemented on a control platform, either through a direct lookup table by precalculating the behavior of the models 116 and storing it on control platform memory, or as a real-time model 116 as an integral part of the control loop. The model 116 achieves a relationship between the set points or control variables Q and power losses or efficiency.

The model 116 can receive as input the data generated by the creation 120 and generates a three-dimensional behavioral model for various operating conditions, including operating conditions tested in the measurement stage and operating conditions not measured at the measurement stage. In particular, the three-dimensional behavior model generated by the motor drive model 116 can be used to estimate the operating setpoints of the motor drive system 102 to achieve optimal efficiency for various operating conditions. Thus, the model 116 can receive as input the desired or real-time operating conditions 122 and, based on the three-dimensional behavior model, outputs optimal setpoints 124 for the motor drive system 102. The optimal setpoints 124 reflect control variables that are optimal to maximizing the drive efficiency or to minimize losses of the motor drive system 102. The optimal setpoints 124 can be used to adjust operation of the motor drive system 102 to achieve the optimal efficiency for real-time operating conditions.

Figure 2:
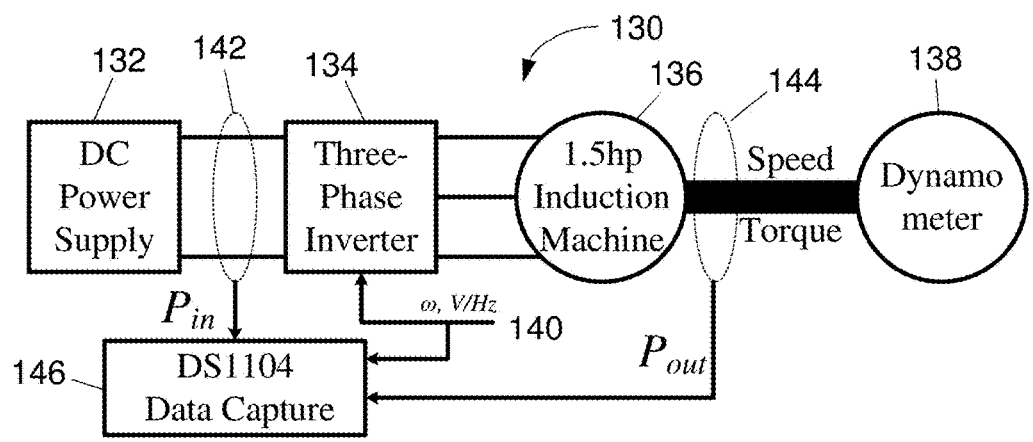
FIG. 2 is a diagram of an exemplary data capture system of a motor drive according to the present disclosure.

FIG. 2 shows a diagram of an exemplary data capture system 130 used to capture measurements of a motor drive system. It should be understood that the described measurements and three-dimensional model generation can be performed for different types of motor drive systems to customize the generated model and optimization estimates for the specific motor drive systems. As will be discussed below, the motor drive system 130 was used to demonstrate the development of a comprehensive behavioral power loss model. The system 130 includes a DC supply 132 with ±1.5% measurement accuracy through its own analog output ports, a three-level three-phase inverter 134, a 4-pole 1.5 hp three-phase squirrel-cage induction machine or motor 136, and a dynamometer 138 that sets different loading conditions. The machine 136 was controlled by a V/Hz algorithm 140 implemented on a dSPACE DS1104 platform (e.g., a data capture platform 146). The DC input $P_{DC}$ and the output mechanical power $P_M$ were measured or captured through dSPACE using a voltage and current feedback loop 142 from the DC supply 132, and a speed and torque feedback loop 144 from the dynamometer 138 along with two control parameters: Q={ωm, V/Hz} where ωm is the speed set point and V/Hz is the voltage-to-frequency ratio that can be used for flux weakening and later for efficiency enhancement in the combined drive system 130.

Figure 3:
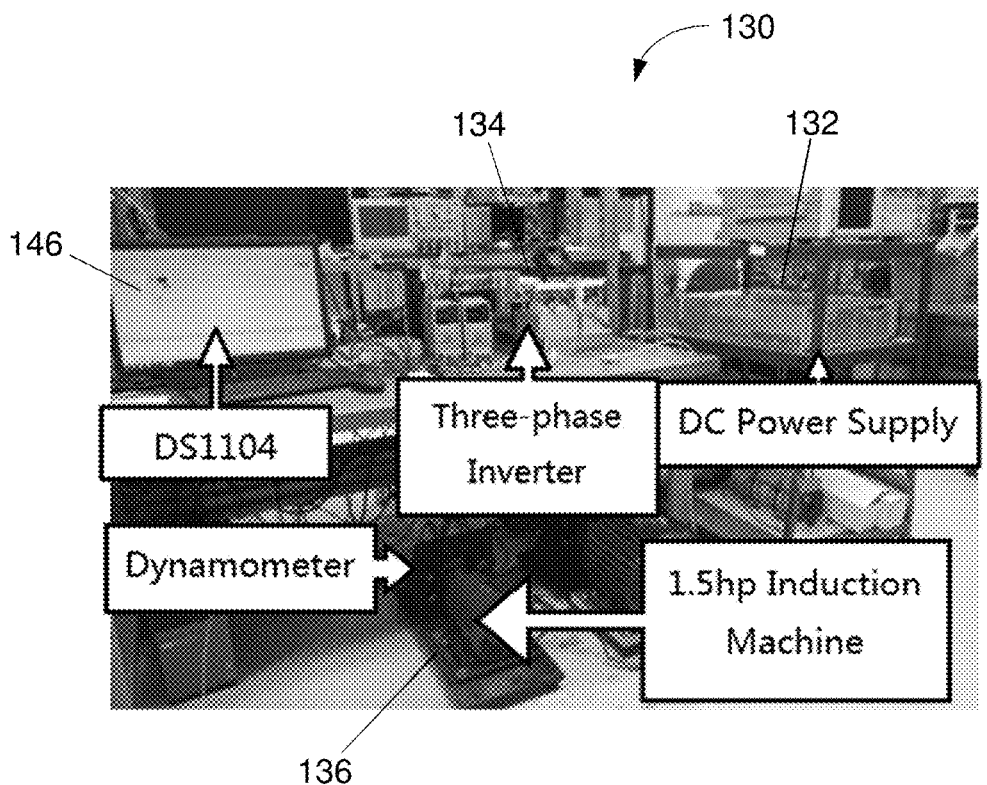
FIG. 3 is an exemplary experimental setup of a data capture system of a motor drive according to the present disclosure.

The system was run under eight different torque load conditions of 100%, 80%, 75%, 50%, 33%, 25%, 19% and 10% of the motor rated torque at a speed setting using a 60 Hz fundamental inverter frequency. For each load condition, the V/Hz ratio was weakened from its rated value and the $P_{DC}$, $P_M$, ωm, and V/Hz were recorded. While FIG. 3 shows the block diagram of the system 130, FIG. 3 shows the experimental setup for the system 130. It should be noted that the motor type, inverter type, control algorithm, and load type can be changed as illustrated in FIG. 1, while the exemplary data capture methods remains the same. In some embodiments, speed or torque estimates can be used instead of measurements can be used.

After data capture of $P_{DC}$ and $P_M$, the efficiency η of the system 130 at specific load torque and V/Hz ratio conditions was calculated by Equation 1:

$$\eta(\text{V/Hz, Load}) = \frac{P_M(\text{V/Hz, Load})}{P_{DC}(\text{V/Hz, Load})} * 100\% \qquad (1)$$

Figure 4:
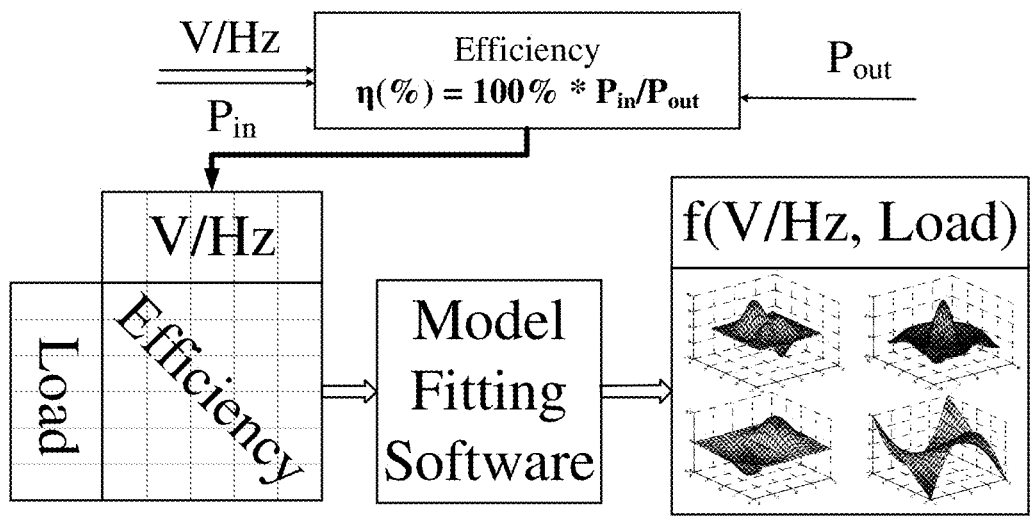
FIG. 4 is a diagram of raw data processing and model creation according to the present disclosure.

Speed is a fixed set point through a frequency of 60 Hz, while torque is a variable and the V/Hz ratio is a control variable that can be used to maximize η for a given load condition. Therefore, there are two independent variables, load torque and V/Hz, and one dependent variable η, resulting in three-dimensional (3D) surfaces that model the interaction between all three to generate an efficiency model of the combined drive system. The terms model, surface, surface fit or fit are used interchangeably, and should be understood to have the same meaning. Processed data was fitted using different 3D surface fitting methods which are described below. FIG. 4 is a diagram summarizing the raw data processing and model creation process, including determination of efficiency based on the load torque and V/Hz ratio, surface fitting software that receives the data associated with efficiency, and a 3D model generated from the surface fitting software.

Seven different surface fits were used, resulting in seven different 3D behavioral models of the motor drive system. Surface fits used were thin-plate spline; biharmonic, cubic and linear interpolation; quadratic and linear locally weighted scatterplot smoothing (LOWESS); and polynomial with x order 5 and y order 4. x and y are variables that together form the x-y plane in the 3D surface being fitted.

Thin plate spline is a method where each spline, a section of a surface around a training point, has a kernel function defined as $z(x,y)=(x^2,y^2)\log(\sqrt{(x^2,y^2)})$. Each spline resists shaping caused by the training point and the splines around it, resulting in a smooth, differentiable surface and with a closed form solution. Biharmonic interpolation, also a spline based method, and the solution to each spline in such interpolation must obey the biharmonic equation $\nabla^4 f=0$ where $f$ can be any function. However, in the exemplary methods, a polynomial function with varying order was used. Such a constraint results in splines with polynomial solutions of varying order. Similarly to thin-plate spline, a biharmonic surface is a smooth and differentiable surface. Biharmonic formulation is identical to Bezier surfaces, which makes surfaces created by such interpolation a minimum surface (minimum surface area given training data).

Cubic and linear interpolations are also spline-based fits. In case of the linear interpolation, each spline is a linear function with respect to each independent variable and quadratic at the training point and obeying equation $f(x,y)=\Sigma_{i=0}^{1}\Sigma_{j=0}^{1}a_{ij}x^{i}y^{j}$ where $a_{ij}$ are parameters to be calculated. Linear interpolation results in a surface with a very good fit to training data. However, due to the high rigidity (caused by low order of x and y) of splines the surface is nonsmooth and hard to differentiate. Cubic interpolation is similar to linear v interpolation. However, here the splines are cubic and of the form $f(x,y)=\Sigma_{i=0}^{3}\Sigma_{j=0}^{3}a_{ij}x^{i}y^{j}$ resulting in a smoother, differentiable surface due to lower stiffness of each spline.

LOWESS is a non-parametric regression model which combines multiple models into a metamodel. It is also a spline-based method and in general splines are either linear or quadratic since higher order polynomials or different functions result in an over fit and inaccurate representation of the surface being modeled using LOWESS. The method is flexible and can be used to model and predict complex processes for which analytical solutions do not exist or are hard to define. LOWESS is however inefficient with training data and requires large densely sampled training set and can be intensive computationally.

Polynomial fit is where a single polynomial equation is fit to training data. The equation form can be represented as $f(x,y)=\Sigma_{i=0}^{n}\Sigma_{j=0}^{m}a_{ij}x^{i}y^{j}$. In polynomial fit, the values of $a_{ij}$ are chosen such that the error between the training data and surface fit is minimum. The error metric can be either the mean square error or residual sum of squares. Additionally, polynomial surface fit results in a model that has a closed form expression that is easily extractable, unlike spline-based methods, where a single closed-form solution is not available.

The number of possible models can be expanded by creating metamodels, e.g., models that consist of combinations of other sub-models which only apply to certain operating regions of a system. For example, if a 3D surface is mostly planar in one region and concave in another region, a simple plane can be used to model the planar region and a higher order polynomial can model the concave region. Such an approach is similar to spline-based surface fitting, where each spline has a different set of coefficients for the same kernel function, while in a metamodel each spline has a different set of parameters and a different kernel function from the neighboring models.

Figure 5:
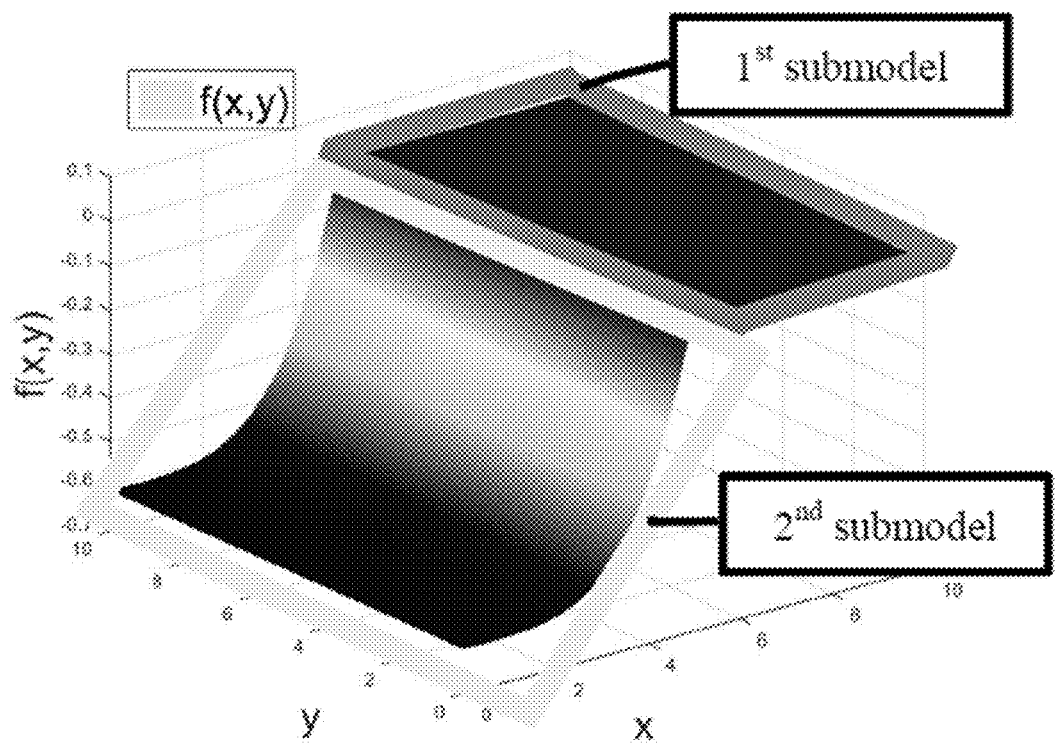
FIG. 5 is a metamodel of an exemplary three-dimensional behavior model according to the present disclosure.

As shown in FIG. 5, a metamodel was fit to the data and includes two sub-models. To find the boundary between the two sub-models, a systematic search was performed for the optimal border that results in two optimal sub-models. The first sub-model was chosen to be a polynomial surface with x order 2 and y order 2 due to its simplicity and ability to accurately model many surfaces with slight convexity or concavity given that it showed a high adjusted-$R^2$ value. The adjusted-$R^2$ quantifies the quality of the fit to training data and predictive power of the model, while taking into account the number of training data points and number of independent variables.

Search for the first sub-model boundary included extracting a certain number of points from each load condition in the training data set until all of the training data was exhausted. The rest of the data which was not used for training the first sub-model of the metamodel was used to train the second sub-model based on the pool of fits discussed above. This approach helped achieve a simpler model for at least a portion of the efficiency surface of interest, while a more complex or higher-order model can be used for the rest of the surface. An example of a metamodel is shown in FIG. 5, where two sub-models are marked and the border between the two is shown by the rectangular shapes. The first sub-model, which is valid for x greater than 5 (e.g., the upper rectangle), uses a simple plane to represent the data, while the second sub-model model, valid for x less than or equal to 5 (e.g., the lower rectangle), is a polynomial quadratic in y and linear in x variable.

Figure 6A:
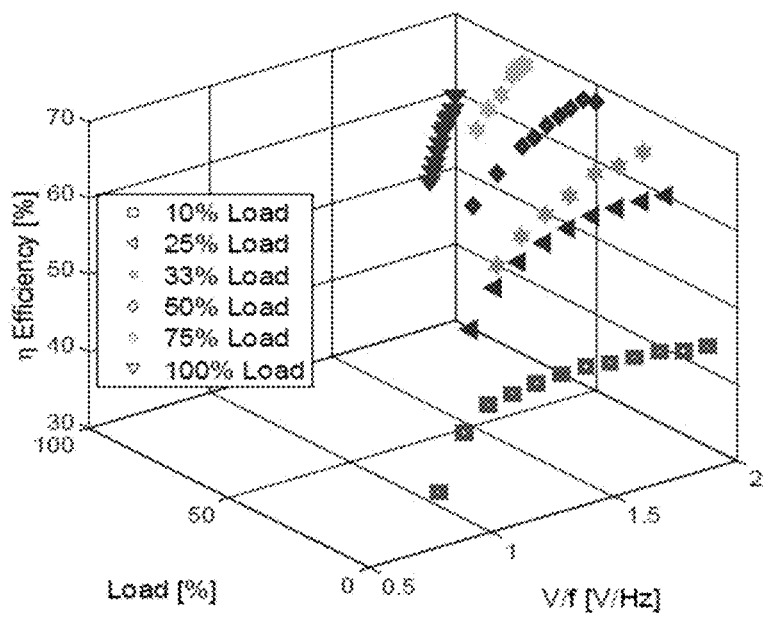
FIG. 6A is a graph of motor drive efficiency data for different loads, according to the present disclosure.

Using hardware described above, raw data was gathered and processed to create behavioral models based on disclosed methods. The data included various V/Hz ratios for 100%, 75%, 50%, 25% and 10% of torque load. FIG. 6A shows experimental efficiency data for V/Hz ratios of 100%, 75%, 50%, 33%, 25% and 10% of torque load. Resulting efficiency versus V/Hz ratio and load and are shown in the graphical representation of FIG. 6B. FIG. 7 is a table of model names used for generation of the models, including thin-plate spline interpolation, biharmonic interpolation, cubic interpolation, linear interpolation, linear LOWESS, quadratic LOWESS, polynomial, and metamodel. Numerical efficiency data for the training of the motor drive efficiency is shown in FIG. 8.

Figure 6B:
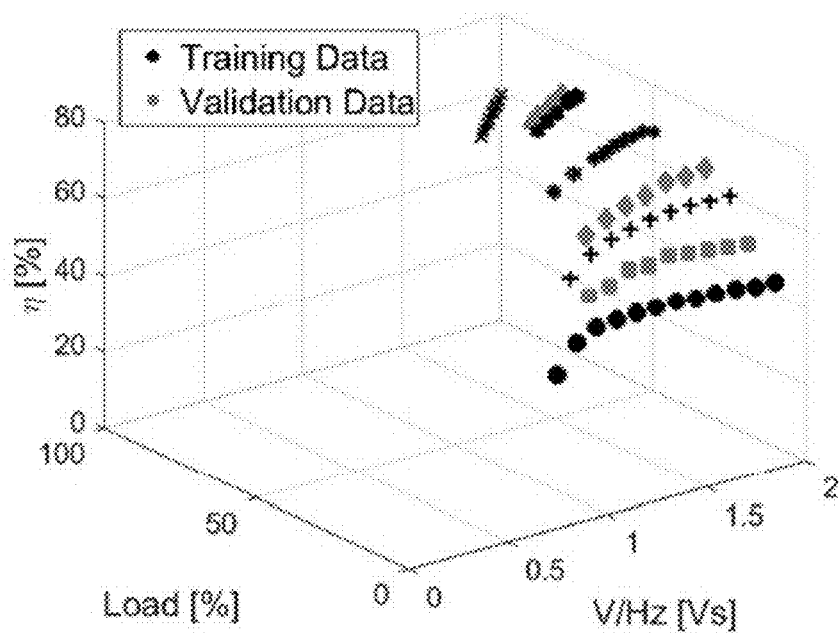
FIG. 6B is a graph of motor drive efficiency training and validation data.
Figure 9C:
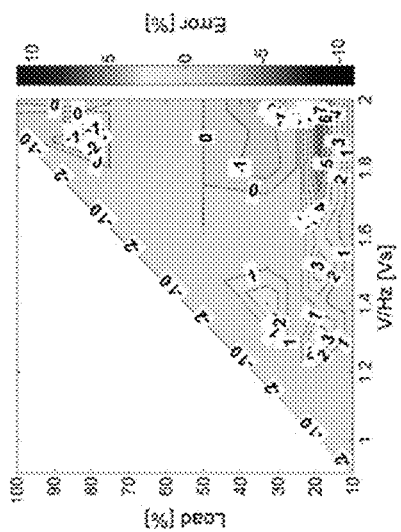
FIG. 9C shows a two-dimensional view of percentage errors associated with linear interpolation.
Figure 9B:
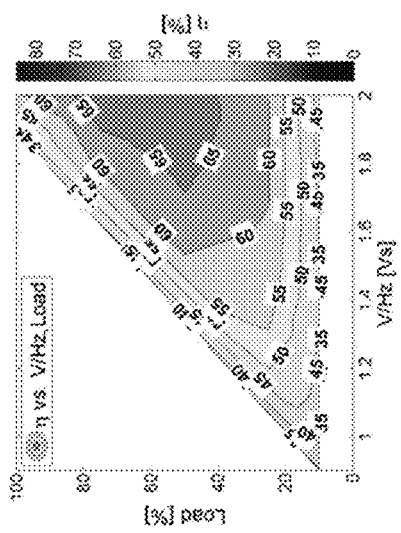
FIG. 9B shows a two-dimensional contour views for linear interpolation.
Figure 9A:
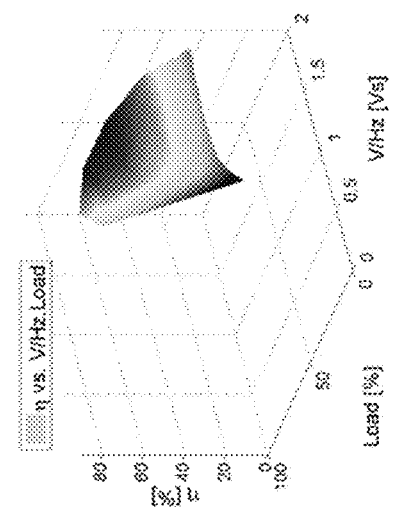
FIG. 9A shows a three-dimensional behavior model for linear interpolation.
Figure 10C:
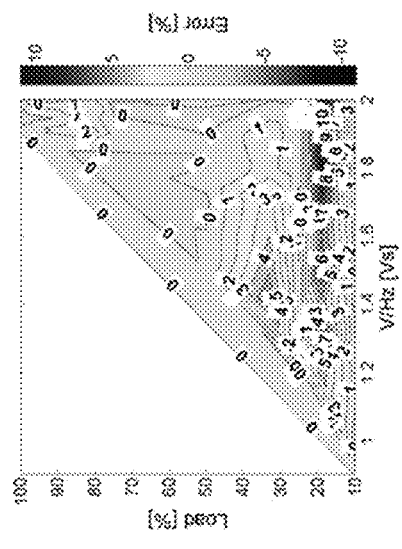
FIG. 10C shows a two-dimensional view of percentage errors associated with polynomial interpolation.
Figure 10B:
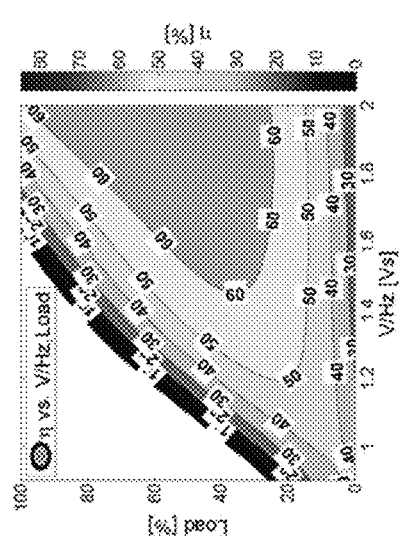
FIG. 10B shows a two-dimensional contour views for polynomial interpolation.
Figure 10A:
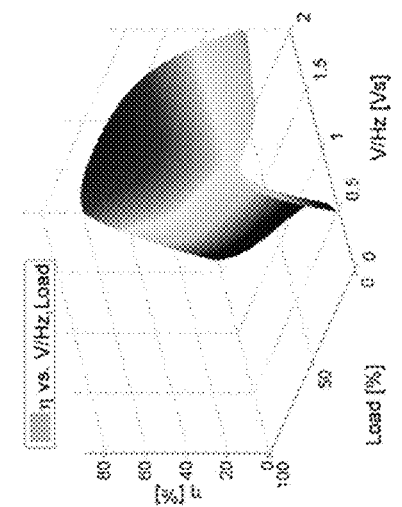
FIG. 10A shows a three-dimensional behavior model for polynomial interpolation.
Figure 11A:
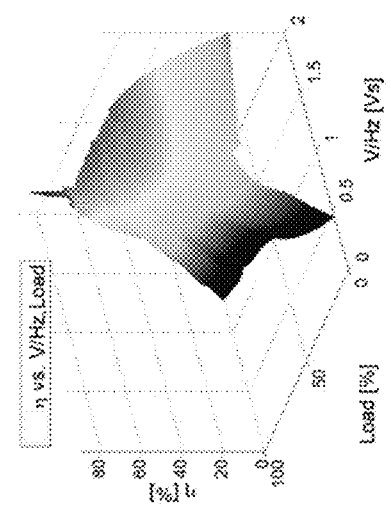
FIG. 11A shows a three-dimensional behavior model for quadratic LOWESS.
Figure 11B:
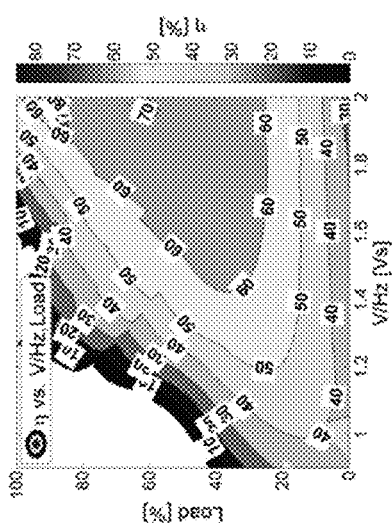
FIG. 11B shows a two-dimensional contour views for quadratic LOWESS.
Figure 11C:
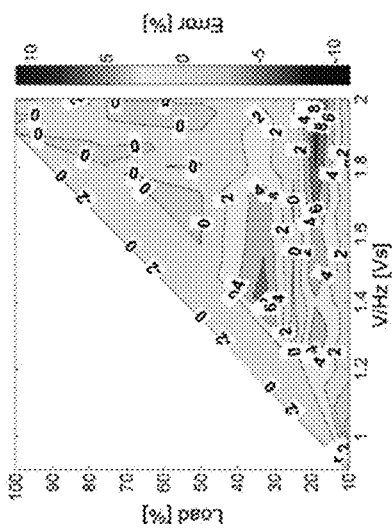
FIG. 11C shows a two-dimensional view of percentage errors associated with quadratic LOWESS.

Data presented in FIGS. 6A-6C was used to create the behavioral models in the form of 3D surfaces. In particular, FIGS. 9A-9C, FIGS. 10A-10C and FIGS. 11A-11C show surface fitting results for three of seven methods used to translate the data points from FIGS. 6A-6C into a three-dimensional model. FIGS. 9A, 10A and 11A show three-dimensional behavioral models, FIGS. 9B, 10B and 11B show two-dimensional contour views, and FIGS. 9C, 10C and 11C show two-dimensional views of percentage errors for linear interpolation, polynomial interpolation, quadratic LOWESS, and metamodel. The error figures clearly illustrate that each model fits the data differently.

In order to validate accuracy and performance of the developed models developed, another set of data was obtained from the setup for 80%, 33% and 19% load conditions for various V/Hz ratios (i.e., previously untested conditions). This testing allowed for exploration of model errors for a representative cross-section of possible loads. In particular, this data was not used to fit the surfaces for models and is shown in FIG. 6. Numerical validation data for the motor drive efficiency is shown in FIG. 13.

Percentage errors of all models for 19%, 33% and 80% loads is shown in FIGS. 14-16. The numerical data and error maps of the testing and validation data set (i.e. 19%, 33%, and 80% loads) reveal that the models achieve high accuracy and maximum average error considering all models for the validation data set are 7.55% while the highest single point error is 11.61% occurring in the 19% load set. At 33% percent load, the models display much higher accuracy as the highest average error is around 4% and the maximum single point error is 7.43% occurring at deep flux weakening. At the 80% load, the models are performed almost perfectly with the highest average error at 1.17% and the single highest single point error at approximately 2%. From FIGS. 9A-9C, FIGS. 10A-10C, FIGS. 11A-11C and FIGS. 12A-12C, the greatest error is concentrated on the load lines which were not used for model creation while error at the training data points is very small, as was expected.

A metamodel was built for the training data shown in FIG. 5 (black markers) using the methods described above. The best adjusted-$R^2$ for the polynomial x order 2 and y order 2 was found to be 0.9619 when six points were extracted from each load line. The top sub-model encompassed thirty training points from fifty training points available, accounting for 60% of the training data. The remaining data, i.e., twenty points, were fit using a cubic interpolation model which resulted in the best adjusted-$R^2$ equal to one and the smallest residual error among other models described above.

Figures 12A, 12B, 12C:
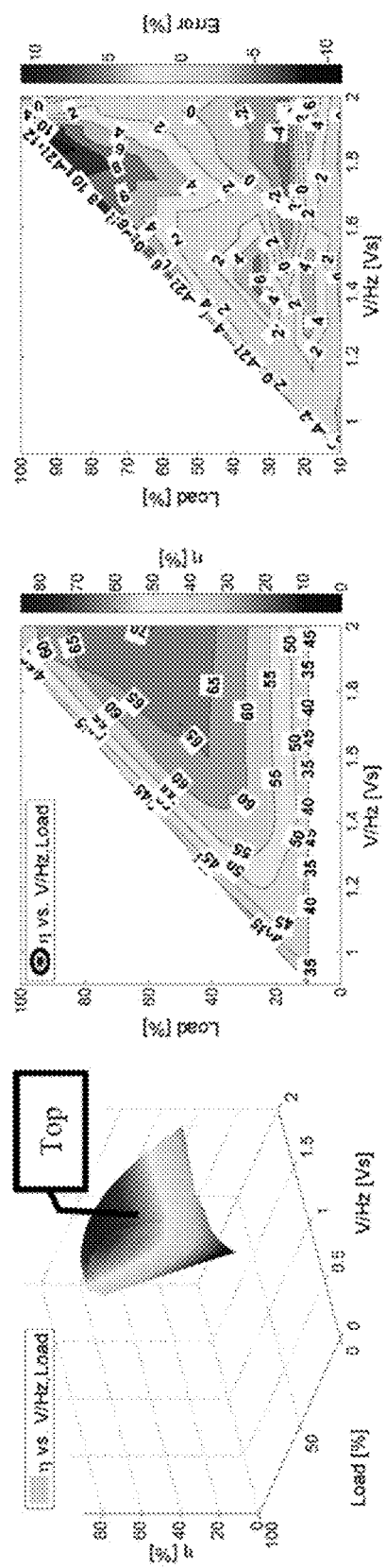
FIG. 12A shows a three-dimensional behavior model for a metamodel.
FIG. 12B shows a two-dimensional contour views for a metamodel.
FIG. 12C shows a two-dimensional view of percentage errors associated with a metamodel.

The resulting three-dimensional behavior model surface, the two-dimensional contour view, and the two-dimensional view of percentage error are shown in FIGS. 12A-C Behavioral models fit the training data with high accuracy as seen in the error maps, and most of the errors occurring at the load lines which were not included in the training data. The accuracy of the prediction of the models decreased with the load and V/Hz ratio. However, the models were still able to predict the system efficiency with less 12% error for a single point while the average error over a load line did not exceed 8% and in general it was well below 5%.

From the data it can be observed that each surface fit creates its own models and fits to the training data differently, resulting in different error map. From the numerical percentage error tables and the error maps it can be observed that certain models predict the behaviors of the systems at low loads and flux weakening while, others display better accuracy at high loads and closer to the rated conditions. At 19% load, the linear LOWESS has the lowest percentage error across almost all the V/Hz ratios considered and also has lowest average error, hence linear LOWESS can be used to model the system at this load. For the 33% load, at deep flux weakening, the linear LOWESS has the smallest percentage error, cubic interpolation predicts best at light flux weakening, while polynomial has the best fit at the rated conditions and smallest average error. At the 80% load, all of the models displayed low error and any model would be able to predict behavior of the system accurately.

As shown in FIG. 12C, the polynomial and cubic interpolation metamodel has its own distinct error map which is unique from error of the models presented. Moreover, the error map for the cubic interpolation model and sub-model from the metamodel are different showing that different fits are developed. The error map of the metamodel in FIG. 12C and numerical data in the tables of FIGS. 14-16 show that the metamodel develops accurate fit to the data. The model accuracy is slightly decreased as compared to other models. However, the error does not exceed 2.5% at the 80% load torque validation data. At the 33% validation data, the metamodel was able to accurately predict motor drive system behavior and the maximum error was approximately 6.5%. At the 19% load torque validation load line, the metamodel performs the best where often it is the most accurate model, especially at shallow flux weakening where the drive would operate while under the efficiency optimization algorithm and maximum error did not exceed 6.6%.

The metamodel presented also shows another benefit. A large part of the data was represented using a simple quadratic equation (per variable) $f(x,y)=p_{00}+p_{10}x+p_{01}y+p_{20}x^2+p_{11}xy+p_{02}y^2$. The top sub-model of the metamodel uses six parameters to represent the models which are shown in the table of FIG. 17. Since the bottom sub-model, which is spline based, is valid for a smaller region as compared to a behavioral model, the overall complexity and size of the metamodel is smaller as compared to other behavioral models developed, while minimally degrading the accuracy of the top model and improving fit at low load conditions.

As part of model performance evaluation, it is desirable to find the optimal control variable (V/Hz ratio) for different loading conditions by analytically solving for that optimal value using a behavioral model. As an example, the polynomial model was used as it had readily accessible closed-form expression which can be quickly and easily analyzed using basic derivative calculus given that for each loading condition, there exists a single maximum efficiency with no local-maxima. From the polynomial behavioral model, a closed-form equation was extracted and is shown below as Equation 2.

$$\eta(x, y) = p_{00} + p_{10}x + p_{01}y + p_{20}x^2 + p_{11}xy + p_{02}y^2 + p_{30}x^3 + \quad (2)$$
$$p_{21}x^2y + p_{12}xy^2 + p_{03}y^3 + p_{40}x^4 + p_{31}x^3y + p_{22}x^2y^2 +$$
$$p_{13}xy^3 + p_{04}y^4 + p_{50}x^5 + p_{41}x^4y + p_{32}x^3y^2 + p_{23}x^2y^3 + p_{14}xy^4$$

Parameters $p_{ij}$ are shown in the table of FIG. 18. Differentiating with respect to the V/Hz control variable (e.g., x), the load (e.g., y) fixed at a constant value, setting the resulting equation to zero and solving, the optimal V/Hz ratio was found by Equations 3 and 4.

$$\left.\frac{\partial F(x, y)}{\partial x}\right|_y = 0 \quad (3)$$

where $$\frac{\partial \eta(x, y)}{\partial x} = 5p_{50}x^4 + 4p_{41}x^3y + 4p_{40}x^3 + \quad (4)$$
$$3p_{32}x^2y^2 + 3p_{31}x^2y + 3p_{30}x^2 + 2p_{23}xy^3 + 2p_{22}xy^2 +$$
$$2p_{21}xy + 2p_{20}x + p_{14}y^4 + p_{13}y^3 + p_{12}y^2 + p_{11}y + p_{10}$$

The polynomial model was able to predict the most efficient operating point with high accuracy where the largest error was 9% and in general the error was below 5%. The closed form solutions obtained from the polynomial model calculated the maximum efficiency point with high accuracy and the optimal V/Hz ratio was predicted within 3.5% while the efficiency at that point was within 2% of the actual efficiency. Results of the most efficient operating point conditions are summarized in the table of FIG. 19, where experimental and behavioral-model-based values are compared.

The two main sources of error with behavioral modeling of the combined drive efficiency are accuracy of the experimental measurement and accuracy of the surface fitting methods. Experimental measurement accuracy is a common concern for both behavioral and analytical models since analytical models have to be validated with experimental results that in turn have measurement error. In behavioral models, this error is an integral part of the data and is "fit" along with the desired measurements. Although surface fitting methods are never 100% accurate, they can provide a faster and more comprehensive approach to drive system efficiency modeling as compared to analytically derived counterparts. Analytical models may still be used in design, simulation, and other areas. In some embodiments, a hybridized model including both analytical and behavioral aspects, as well learning methods where model refinement is a continuous, can be used. However, the behavioral models disclosed herein show high accuracy in predicting the drive-level system efficiency and the approach is scalable to various power levels and different technologies. Some of the data used in the exemplary methods may be available during testing, validation, and/or commissioning of drive systems.

Figure 20:
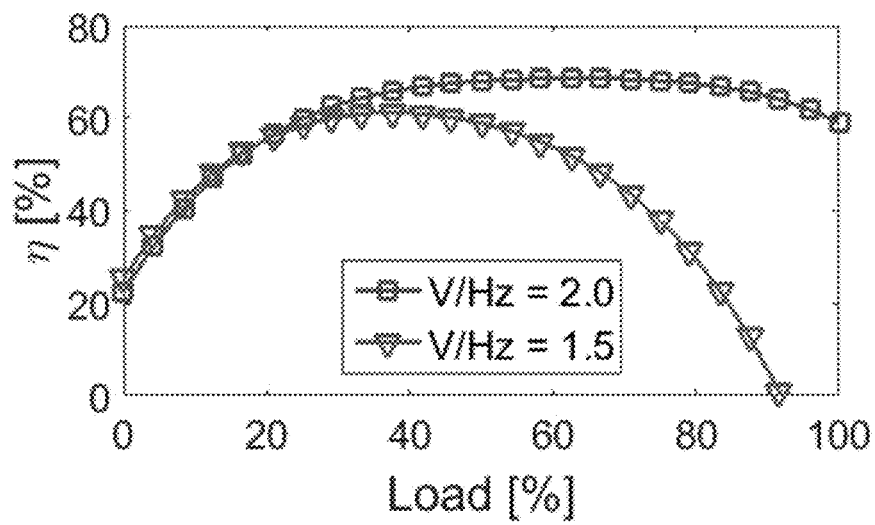
FIG. 20 shows motor drive efficiency at a fixed V/Hz ratio versus load torque according to the present disclosure.
Figure 21:
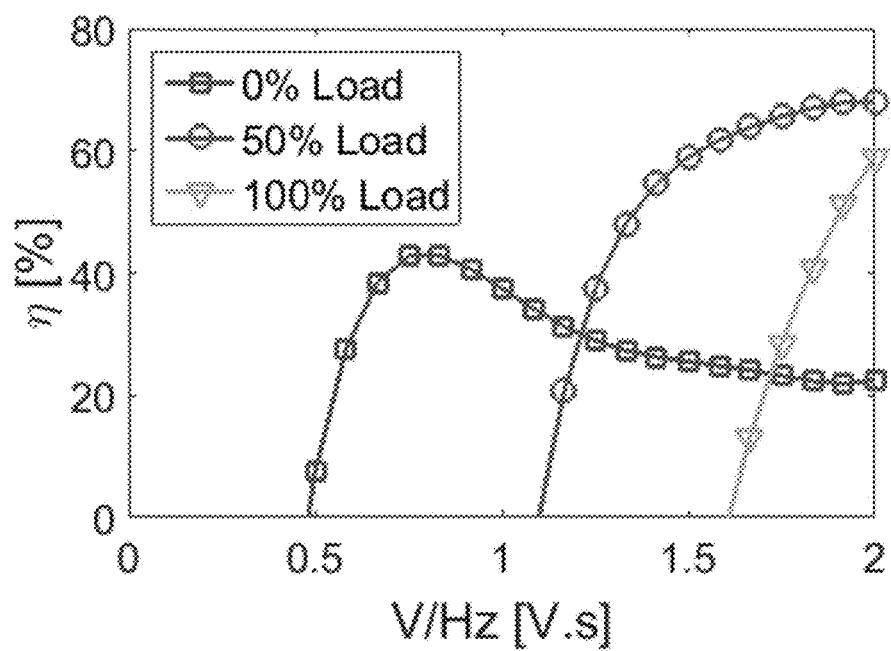
FIG. 21 shows motor drive efficiency at constant load versus a V/Hz ratio according to the present disclosure.

FIGS. 20 and 21 show sliced cross-section examples of a polynomial-fitted surface with V/Hz value and load value as constant, respectively, to correlate the behavioral model with physical interpretation. In FIG. 20, the efficiency η under the rated V/Hz and a weakened V/Hz are compared with respect to different load conditions. The efficiency η increases with load when load is low (e.g., less than 20%) for both V/Hz conditions, since the core loss dominates the machine losses under low load conditions. The core loss, however, does not change with load or load current significantly as compared to copper loss. Thus, when load increases, the total machine loss only slightly increases in value due to copper loss and then decreases in percentage.

As only an oversized inverter was available for experimentation, the change of inverter loss is small with respect to the load current. The major part of the inverter loss of the oversized inverter is the switching loss which is almost a constant due to the constant pulse-width modulation switching frequency. Therefore, the change of drive efficiency follows the same trend of the induction machine efficiency. The efficiency $\eta$ under the weakened flux is higher than the efficiency II under the rated flux in low load conditions, which is the fundamental of efficiency $\eta$ enhancement using flux weakening. In V/Hz control, the V/Hz value decides the stator flux level and the core loss value. As the electromagnetic torque is a product of machine current and flux in the induction machine, the V/Hz value indirectly decides the current level to provide an adequate torque matching load requirement. In particular, the V/Hz value decides the machine core loss and copper loss with a different combination of flux and current that are all enough to support the load torque. In low load conditions, the flux is over-strengthened. Thus, reallocating the core loss and copper loss by properly weakening the flux can render a decrease of overall machine losses. The efficiency $\eta$ starts decreasing at certain higher load point due to insufficient flux and the starting point is earlier for lower V/Hz condition. The inadequate flux causes significant increases of machine current and copper loss, which tries to provide enough load torque. It is noted that experimental high loading conditions with weakened flux were not captured as the machine would stall due to weak flux that cannot support the high torque.

In FIG. 21, the applicability of flux weakening for efficiency $\eta$ enhancement under different load condition is shown. With a lighter load, the flux can be weakened deeper without stalling the machine. However, the benefit of flux weakening is not found in the medium and full load conditions. Efficiency $\eta$ enhancement is obtained under the no-load condition, where the efficiency $\eta$ increases gradually with the decrease of V/Hz value until the flux is too weak. Moreover, higher load shows higher efficiency at high V/Hz conditions (close to two) when comparing the three curves vertically, as was expected.

Thus, an exemplary method of modeling motor drive systems is disclosed that accurately generates a three-dimensional behavioral model of the motor drive system. The exemplary methods are based on control quantities and physical measurement of input and output power using behavioral modeling. The physical measurements do not assume or ignore any losses, which is often done in analytical efficiency modeling, thus rendering the disclosed models comprehensive. Behavioral models disclosed herein include all elements of the motor drive system, which traditionally were not used due to complexity of such systems. A drive system with an inverter and induction motor was used to demonstrate the exemplary methods and disclosed how a behavioral model can be used to operate the drive system at maximum efficiency.

The models disclosed herein showed high accuracy and were able to predict the efficiency of the system with a maximum error below 12% for a single point. The closed-form solution to the system was also used to predict the most efficient V/Hz ratio and the maximum system efficiency with good results. The model was able to predict the most efficient operating V/Hz ratio within 3.5% error and the highest efficiency within 2% error. Implementation of such maximum-efficiency operating conditions in real-time can be achieved by either online or real-time calculation of the optimal V/Hz ratio, or via look-up tables that implement the behavioral model numerically.

Using a systematic approach, a metamodel was developed where polynomial and cubic interpolant models were used as sub-models to be fit to a specific region of the training data. The developed model presented a good fit for high and medium load conditions and presented a highly accurate fit for the low load conditions where it is often the most accurate model. One benefit of this model is the reduced computational and mathematical complexity for portions of the efficiency surface. The validity and accuracy of the models were discussed where the surface shapes were compared against the known analytical loss models and it was found that the exemplary behavioral models capture the various machine and inverter loss dynamics and represent them accurately.

Figure 22:
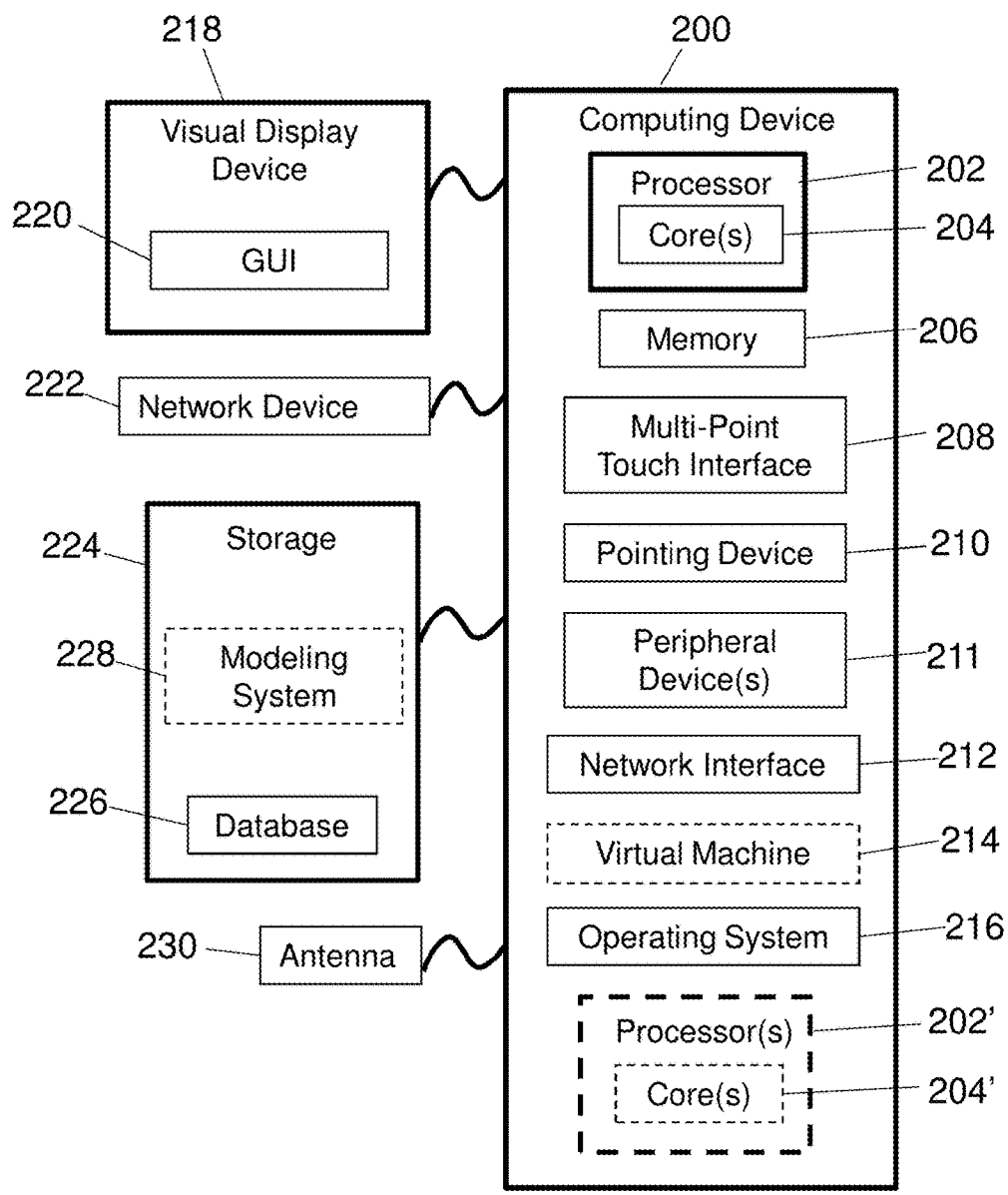
FIG. 22 is a diagram of a computing device according to the present disclosure.

FIG. 22 is a block diagram of a computing device 200 configured to implement embodiments of the motor drive operation optimization system in accordance with embodiments of the present disclosure. The computing device 200 can be a controller of a motor drive, a computer configured to receive measured data from the motor drive and regulate the motor drive operation to achieve optimal efficiency, combinations thereof, or the like. The computing device 200 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 206 included in the computing device 200 may store computer-readable and computer-executable instructions or software for implementing exemplary embodiments of the present disclosure. The computing device 200 also includes configurable and/or programmable processor 202 (including a central processing unit (CPU)) and associated core 204, and optionally, one or more additional configurable and/or programmable processor(s) 202' and associated core(s) 204' (for example, in the case of computer systems having multiple processors/cores), for executing computer-readable and computer-executable instructions or software stored in the memory 206 and other programs for controlling system hardware. Processor 202 and processor(s) 202' may each be a single core processor or multiple core (204 and 204') processor.

Virtualization may be employed in the computing device 200 so that infrastructure and resources in the computing device may be shared dynamically. A virtual machine 214 may be provided to handle a process running on multiple processors so that the process appears to be using only one computing resource rather than multiple computing resources. Multiple virtual machines may also be used with one processor.

Memory 206 may include a computer system memory or random access memory, such as DRAM, SRAM, EDO RAM, and the like. Memory 206 may include other types of memory as well, or combinations thereof.

A user may interact with the computing device 200 through a visual display device 218, such as a computer monitor, which may display one or more user interfaces 220 that may be provided in accordance with exemplary embodiments. The computing device 200 may include other I/O devices for receiving input from a user, for example, a keyboard, peripheral devices 211, or any suitable multi-point touch interface 208, a pointing device 210 (e.g., a mouse), or the like. The keyboard 208 and the pointing device 210 may be coupled to the visual display device 218. The computing device 200 may include other suitable conventional I/O peripherals.

The computing device 200 may also include one or more storage devices 224, such as a hard-drive, CD-ROM, or other computer readable media, for storing data and computer-readable instructions and/or software that implement exemplary embodiments of the motor drive operation optimization system 228 described herein. Exemplary storage device 224 may store one or more databases 226 for storing any suitable information required to implement exemplary embodiments. For example, exemplary storage device 224 can store data associated with measurements taken from the motor drive, and computer-readable instructions and/or software that implement exemplary embodiments described herein. The databases 226 may be updated by manually or automatically at any suitable time to add, delete, and/or update one or more items in the databases 226.

The computing device 200 can include a network interface 212 configured to interface via one or more network devices 222 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 212 may include a built-in network adapter, network interface card, PCMCIA network card, card bus network adapter, wireless network adapter, USB network adapter, modem or any other device suitable for interfacing the computing device 200 to any type of network capable of communication and performing the operations described herein. The computing device 200 can also include one or more antennas 230 for wirelessly interfacing the computing device 200 to any type of wireless network communication protocol and performing the operations described herein. Moreover, the computing device 200 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 200 may run any operating system 216, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 216 may be run in native mode or emulated mode. In an exemplary embodiment, the operating system 216 may be run on one or more cloud machine instances.

Figure 23:
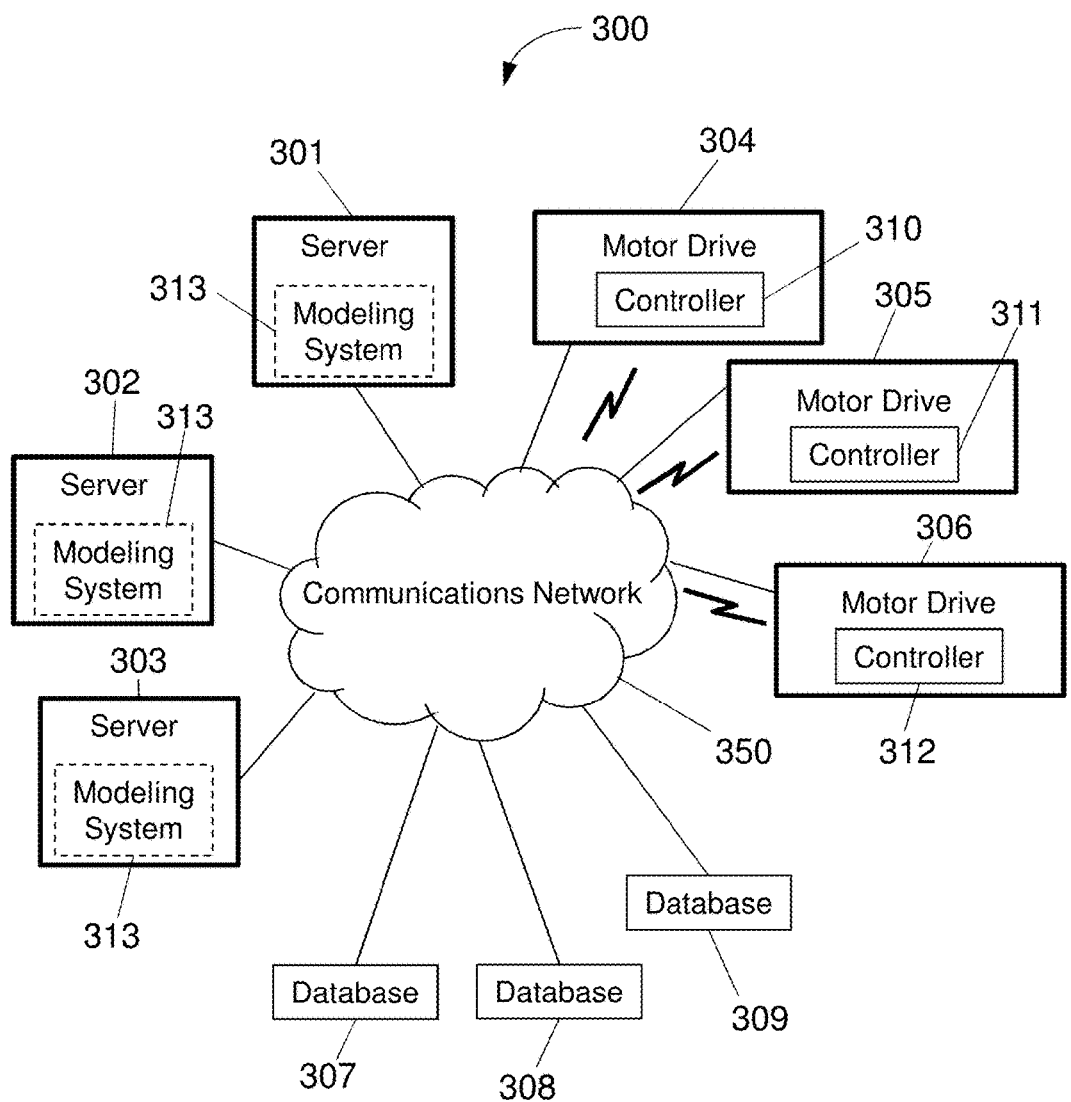
FIG. 23 is a diagram of an exemplary motor drive operation optimization system environment according to the present disclosure.

FIG. 23 is a block diagram of a distributed environment 300 for implementing embodiments of the motor drive operation optimization system in accordance with embodiments of the present disclosure. The environment 300 can include servers 301-303 operatively coupled to one or more motor drives 304-306 including motor drive controllers 310-312, respectively, and databases 307-309, via a communication network 350, which can be any network over which information can be transmitted between the servers 301-303, controllers 310-312, and databases 307-309. For example, the communication network 350 can be the Internet, Intranet, virtual private network (VPN), wide area network (WAN), local area network (LAN), and the like. In exemplary embodiments, the servers 301-303, motor drives 304-306, and databases 306-309 can be implemented as computing devices (e.g., embodiments of computing device 200). Those skilled in the art will recognize that the databases 306-309 can be incorporated into one or more of the servers 301-303 such that one or more of the servers 301-303 can include the databases 306-309. In some embodiments, the databases 306-309 can store information relating to data measured relative to the motor drives 304-306. In some embodiments, embodiments of the server 301 can be configured to implement one or more portions of a motor drive operation optimization modeling system 313. In some embodiments, one or more of the motor drive operation optimization modeling system 313 can be implemented in a distributed configuration over the servers 301-303.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A method of optimizing operation efficiency of a motor drive or generator, comprising:
measuring data corresponding to input power and output power of a motor drive or generator at a control parameter and different load values;
generating a three-dimensional surface model based on the measured data, the three-dimensional surface model estimating an efficiency of the motor drive or generator at the control parameter and at unmeasured load values;
determining optimal efficiency of the motor drive or generator for the different load values and the unmeasured load values based on the three-dimensional surface model; and
adjusting operation of the motor drive or generator in real-time to perform at setpoint configurations in response to load values based on the three-dimensional surface model.

2. The method of claim 1, wherein the control parameter is a voltage-to-frequency (V/f) ratio.

3. The method of claim 1, wherein the method is applied to a motor drive and wherein different load values correspond to loads imparted by a dynamometer load.

4. The method of claim 1, wherein the method is applied to a motor drive and wherein different load values correspond to loads imparted by a torque load.

5. The method of claim 1, comprising measuring power loss of the motor drive or generator at the control parameter and the different load values.

6. The method of claim 5, comprising locating a convex surface corresponding to minimum power loss of the motor drive or generator in the three-dimensional surface model.

7. The method of claim 6, wherein the convex surface corresponding to the minimum power loss corresponds to the optimal efficiency of the motor drive or generator.

8. The method of claim 1, wherein the three-dimensional surface model is a behavior model of the motor drive or generator.

9. The method of claim 1, wherein generating the three-dimensional surface model comprises modeling the three-dimensional surface model by applying a quadratic and linear locally weighted scatterplot smoothing (LOWESS) on the measured data for the motor drive or generator under stator flux weakening operation.

10. The method of claim 1, wherein generating the three-dimensional surface model comprises applying a cubic interpolation on the measured data for the motor drive or generator under a slightly weakened flux operation.

11. The method of claim 10, wherein the three-dimensional surface model generated with the cubic interpolation results in a maximum-efficiency stator flux of the motor drive or generator.

12. The method of claim 1, wherein generating the three-dimensional surface model comprises applying a polynomial interpolation on the measured data for the motor drive or generator under a rated flux operation.

13. The method of claim 1, wherein generating the three-dimensional surface model comprises applying a linear interpolation on the measured data.

14. A system of motor drive or generator optimization, comprising:
    a motor drive or generator;
    a database configured to receive and store data corresponding to input power and output power of the motor drive or generator at a control parameter and different load values; and
    a processing device configured to:
        measure the data corresponding to the input power and the output power of the motor drive or generator at the control parameter and the different load values;
        generate a three-dimensional surface model based on the measured data, the three-dimensional surface model estimating an efficiency of the motor drive or generator at the control parameter and at unmeasured load values;
        determine optimal efficiency of the motor drive or generator for the different load values and the unmeasured load values based on the three-dimensional surface model; and
        adjust operation of the motor drive or generator in real-time to perform at setpoint configurations in response to load values based on the three-dimensional surface model.

15. A non-transitory computer-readable medium storing instructions, wherein execution of the instructions by a processing device causes the processing device to implement a method of optimizing operation efficiency of a motor drive or generator, comprising:
    measuring data corresponding to input power and output power of a motor drive or generator at a control parameter and different load values;
    generating a three-dimensional surface model based on the measured data, the three-dimensional surface model estimating an efficiency of the motor drive or generator at the control parameter and at unmeasured load values;
    determining optimal efficiency of the motor drive or generator for the different load values and the unmeasured load values based on the three-dimensional surface model; and
    adjusting operation of the motor drive or generator in real-time to perform at setpoint configurations in response to load values based on the three-dimensional surface model.

* * * * *